(12) United States Patent
O'Shea (10) Patent No.: US 8,328,175 B2
(45) Date of Patent: Dec. 11, 2012

(54) FRAME FOR A BOARD

(75) Inventor: Mark O'Shea, Dublin (IE)

(73) Assignee: Lifestyle Foods, Dublin (IE)

( * ) Notice: Subject to any disclaimer, the term of this patent is extended or adjusted under 35 U.S.C. 154(b) by 976 days.

(21) Appl. No.: 12/279,975

(22) PCT Filed: May 9, 2006

(86) PCT No.: PCT/IE2006/000053
§ 371 (c)(1),
(2), (4) Date: Oct. 14, 2008

(87) PCT Pub. No.: WO2006/120659
PCT Pub. Date: Nov. 16, 2006

(65) Prior Publication Data
US 2009/0051095 A1    Feb. 26, 2009

(30) Foreign Application Priority Data
May 10, 2005 (IE) .................. S2005/0295

(51) Int. Cl.
*B23Q 3/00* (2006.01)
*E06B 3/70* (2006.01)
*E06B 7/00* (2006.01)
*E06B 3/964* (2006.01)
*E04C 2/38* (2006.01)

(52) U.S. Cl. .............. 269/302.1; 269/289 R; 269/303; 269/308; 52/456; 52/656.8; 52/656.1; 52/455; 52/204.591; 52/204.61

(58) Field of Classification Search .......... 269/302.1, 269/289 R, 303, 308; 52/456, 656.8, 656.1, 52/455, 204.591, 204.61
See application file for complete search history.

(56) References Cited

U.S. PATENT DOCUMENTS

| | | | | |
|---|---|---|---|---|
| 2,609,024 | A | * | 9/1952 | Russ ............................. 269/15 |
| 5,044,059 | A | * | 9/1991 | De Giulio .................... 29/401.1 |
| 5,232,609 | A | | 8/1993 | Badinier et al. |

(Continued)

FOREIGN PATENT DOCUMENTS

DE    4222676    1/1994

(Continued)

OTHER PUBLICATIONS

International Search Report and Written Opinion, PCT/IE2006/000053, Jan. 12, 2006.

*Primary Examiner* — Monica Carter
*Assistant Examiner* — Nirvana Deonauth
(74) *Attorney, Agent, or Firm* — Baker Donelson Bearman Caldwell & Berkowitz, PC (57) ABSTRACT

A frame (1) for receiving and holding a removable board (2) for use in the manufacture of edible products such as bread and the like. The frame (1) comprises a plurality of side walls (100, 101, 102, 103) and reinforcing cross-members (104, 105, 106) so that a board (2) which is adapted to be retained within the frame (1) is protected from damage and wear during transportation along mechanized conveyors in the bread making process. The board (2) is provided with a lip which extends around its perimeter and projects laterally beyond the side walls of the frame to enable removal of the board from the frame. The board (2) further comprises a textured upper surface which helps to prevent dough from sticking and facilitates the eventual removal of the dough from the board.

21 Claims, 6 Drawing Sheets

U.S. PATENT DOCUMENTS

| | | | | |
|---|---|---|---|---|
| 5,366,208 A * | 11/1994 | Benjamin | | 269/13 |
| 5,860,641 A * | 1/1999 | Heath | | 269/289 R |
| 6,478,292 B1 * | 11/2002 | Sellers | | 269/289 R |
| 6,651,970 B2 * | 11/2003 | Scott | | 269/289 R |
| 6,715,748 B2 * | 4/2004 | Thompson et al. | | 269/289 R |
| 2001/0040328 A1 * | 11/2001 | Keener | | 269/289 R |
| 2002/0100372 A1 * | 8/2002 | Bryant et al. | | 99/422 |

FOREIGN PATENT DOCUMENTS

| | | |
|---|---|---|
| FR | 977181 | 3/1951 |
| FR | 1038115 | 9/1953 |
| GB | 2189981 | 11/1987 |
| WO | 00/60946 | 10/2000 |

* cited by examiner

FRAME FOR A BOARD

TECHNICAL FIELD

The present invention relates to a frame for receiving and holding a removable board.

BACKGROUND ART

In the manufacture of certain edible products such as bread and the like, dough is placed onto boards that are transported through the different production stages along automated mechanised conveyors. Often the boards, which are sometimes referred to as "peel-boards", are manufactured from cloth or plastics materials and are pre-sprinkled with a powdery material, such as semolina flour, in order to assist the eventual release of the dough after proving. During transportation, excessive wear is often imparted to the peel-boards through direct contact with the mechanised conveyors and through collisions with other boards on the conveyor system. Such damage reduces the lifespan of the boards and results in the requirement for frequent repair or replacement.

It is therefore an object of the invention to alleviate the disadvantages associated with the prior art.

SUMMARY OF THE INVENTION

Accordingly, the present invention provides a dough piece carrier assembly comprising a frame for releasably receiving and holding a dough carrier board for receiving dough portions thereon and comprises a lip extending along the perimeter of the board and a structural reinforcing means having a plurality of reinforcing web members located on the underside of the board, the frame having a plurality of side walls defining an inner space for releasably receiving the board, wherein the side walls encompass peripheral regions of the board so as to protect said regions from wear during use of the board, and in which each side wall comprises an inwardly facing ledge and the board is supported in the frame on at least one cross member which is connected to and extends between ledges of opposing side walls, and in which each cross member is recessed relative to a distal edge of the side walls such that the board has a wall that resides within the inner space defined by the frame and the lip rests on upper edges of the side walls.

In another aspect, the present invention provides a dough piece carrier assembly, comprising a frame for releasably receiving and holding a dough carrier board, the frame having a plurality of side walls defining an inner space for releasably receiving the board, and each side wall comprising an inwardly facing ledge. At least one cross-member extending between and connected to ledges of opposing sides of the frame and supporting an underside surface of the board in use. A plurality of reinforcing web members located on the underside of the board. The board comprises a textured upper surface for receiving dough portions, the textured upper surface comprising a series of indents serving as air-pockets for preventing the dough from sticking to the upper surface of the board.

In another aspect, the present invention provides a dough piece carrier assembly comprising a frame for releasably receiving and holding a dough carrier board comprising a lip extending along the perimeter of the board and a textured upper surface for receiving dough portions, the textured upper surface comprising a series of indents serving as air-pockets for preventing the dough from sticking to the upper surface of the board, the indents further serving to receive particles of loose material which fall from the dough, the frame having a plurality of side walls defining an inner space for releasably receiving the board, wherein the side walls encompass peripheral regions of the board so as to protect said regions from wear during use of the board, and in which each side wall comprises an inwardly facing ledge and the board is supported in the frame on at least one cross member which is connected to and extends between ledges of opposing side walls, and in which each cross member is recessed relative to a distal edge of the side walls such that the board has a wall that resides within the inner space defined by the frame and the lip rests on upper edges of the side walls.

In yet another aspect, the present invention provides a dough piece carrier assembly comprising a frame for releasably receiving and holding a dough carrier board for receiving dough portions thereon and comprises a lip extending along the perimeter of the board, the frame having a plurality of side walls defining an inner space for releasably receiving the board, wherein the side walls encompass peripheral regions of the board so as to protect said regions from wear during use of the board, and in which each side wall comprises an inwardly facing ledge and the carrier board is supported in the frame on at least one cross member which is connected to and extends between ledges of opposing side walls, and in which each cross member is recessed relative to a distal edge of the side walls such that the board has a wall that resides within the inner space defined by the frame and the lip rests on upper edges of the side walls, wherein the lip has a portion that projects laterally beyond the side walls of the frame so as to facilitate removal of the board from the frame by gripping the projecting portion of the lip.

DETAILED DESCRIPTION

The invention will now be described more particularly with reference to the accompanying drawings, which show, by way of example only, one embodiment of the peel board carrier frame apparatus of the invention.

As discussed in detail below, the present invention provides a dough piece carrier assembly comprising a frame for releasably receiving and holding a dough carrier board, the frame having a plurality of side walls defining an inner space for releasably receiving the board, wherein the side walls encompass peripheral regions of the board so as to protect said regions from wear during use of the board.

Preferably, the frame comprises means for protecting the underside of a board in use.

Preferably, the frame comprises a reinforcing means.

Ideally, the reinforcing means comprises at least one and preferably two cross-members.

Ideally, the frame is sized to restrict lateral movements of the board within the frame during use of the board.

Conveniently, the frame comprises means for retaining a board within the inner space of the frame.

Advantageously, the means for retaining a board includes the at least one, and preferably two cross-members.

Optionally, the means for retaining a board includes a plurality of protuberances on inner surfaces of the side walls for engaging the board to further restrict movement of the board within the frame. Such protuberances may be formed by depressions made in outer surfaces of the side walls.

Preferably, the frame is quadrilateral and ideally is rectangular or square shaped.

The present invention further provides a board sized to be releasably received and held in the frame according to the invention.

Preferably, the board comprises a peel-board for receiving dough portions thereon and has means for retaining the board within the frame in use. Such retaining means may comprise a lip extending along the perimeter of the board for engaging the side walls of the frame upon placement of the board within the frame.

Advantageously, the board includes structural reinforcing means such as a plurality of web members. The web members may be formed integrally with the board structure and ideally are on the underside of the board.

In a preferred embodiment the board has a textured upper surface for receiving the dough portions.

Preferably, the textured upper surface comprises a series of indents which serve as air-pockets for resisting a tendency for dough to stick to the upper surface of the board, and the indents further serve for receiving particles of loose material which fall from the dough. This facilitates the eventual removal of the dough from the board.

Ideally, the board lip projects laterally beyond the side walls of the frame so as to facilitate removal of the board from the frame by gripping the projecting portions of the lip.

Figure 1:
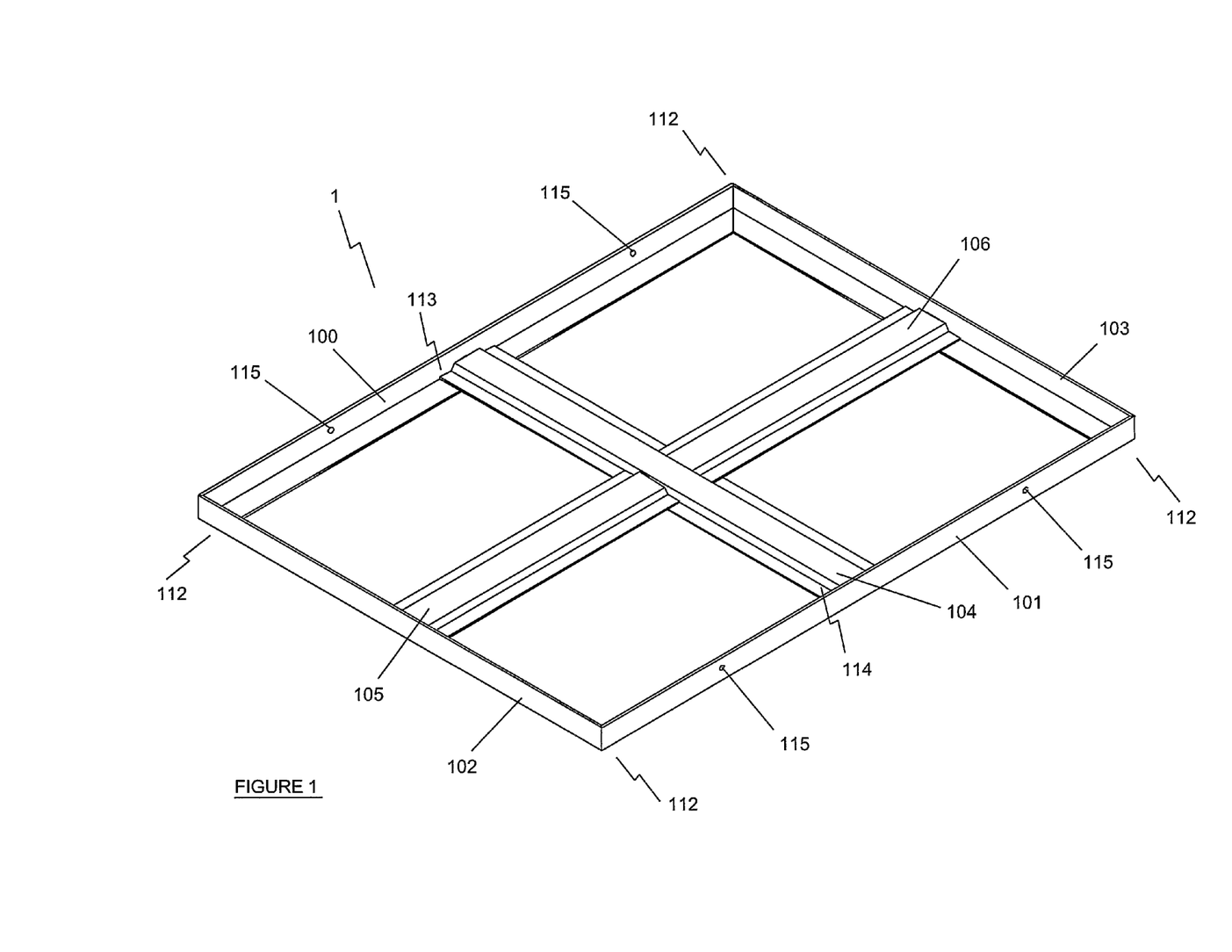
FIG. 1 is an isometric view of the peel board carrier frame.

Referring initially to FIG. 1, a peel board carrier frame 1 comprises side members 100, 101, end members 102, 103, a cross-member 104 and bracing members 105, 106. In this example a board received in the frame 1 is a peel board but it will be appreciated that that the frame may equally be employed with other types of board.

Figure 2A:
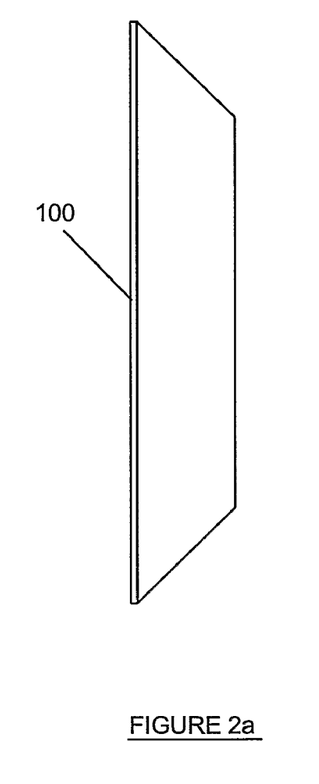
FIG. 2a is a plan view of a peel board carrier frame outer member.
Figure 2B:
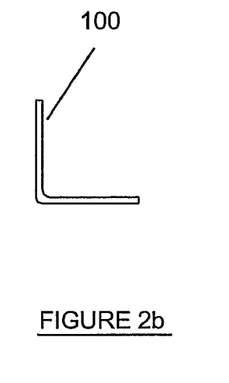
FIG. 2b is an end view of a peel board carrier frame outer member.
Figure 2C:
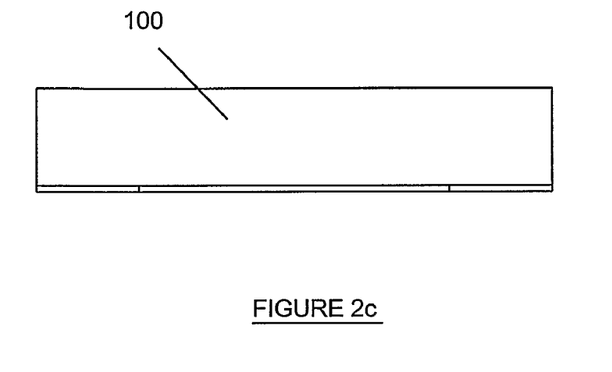
FIG. 2c is a side elevation of a peel board carrier frame outer member.
Figure 3A:
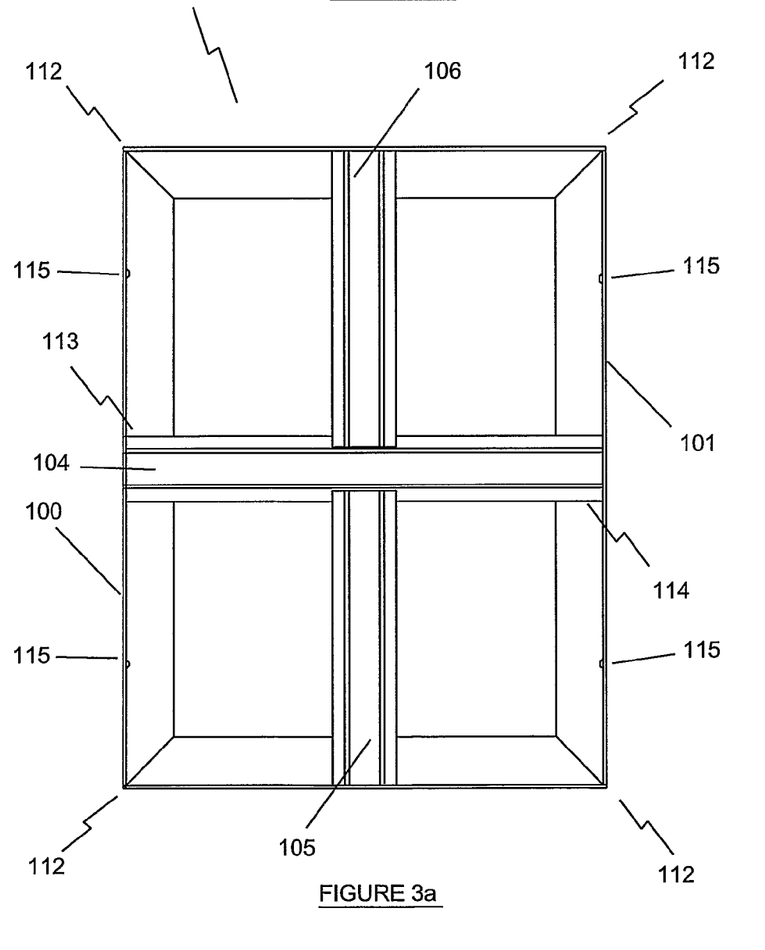
FIG. 3a is a plan view of the peel board carrier frame.
Figure 3B:
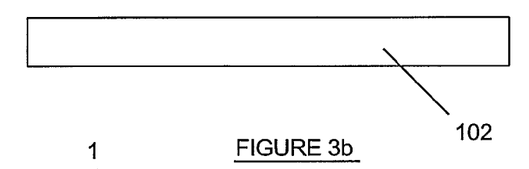
FIG. 3b is an end elevation of the peel board carrier frame.

The frame 1 comprises an outer framework and an inner network of reinforcing cross-members. The outer framework comprises the side members 100, 101, spaced apart from and parallel to each other and the end members 102, 103, spaced apart from and parallel to each other so that when arranged as shown in FIG. 1, they define a rectangular opening. The outer framework members 100, 101 102, 103 are formed from elongate stainless steel members having an L-shaped cross section with a vertical in use leg and a horizontal in use leg arranged at right angles to each other. The ends of the horizontal legs of said members are bevelled inwardly at 45-degree angles. The common overall shape of the members 100, 101, 102 and 103 is shown schematically in FIGS. 2a, 2b and 2c. For clarity and simplicity the member shown is labelled 100 only. When positioned together to define frame 1 as shown in FIG. 3a, the bevelled ends of the members 100, 101, 102 and 103 meet to form 90-degree mitre-joint corners 112. The respective end edges of the vertical legs are also coincident at the corners of the frame 1. The contacting end edges of the respective members 100, 101, 102 and 103 are welded together so that the horizontal legs of the members define a continuous inwardly facing ledge. A continuous vertical wall is defined by the connected vertical legs of the outer frame 1. Other suitable ways are possible for joining the outer members 100, 101, 102 and 103, and indeed integral constriction of the outer members defining the outer framework is possible.

To increase the rigidity of the framework structure an inner network of reinforcing members is provided. The inner framework comprises the transverse cross-member 104, which lies parallel with, and equidistant from, the frame end members 102, 103. The cross-member 104 extends between and is connected to the side members 100, 101. To stiffen the frame 1 along the longitudinal axis, the two shorter bracing members 105, 106, which are of equal length, are connected perpendicularly in relation to the cross-member 104 between the cross-member 104 and the end members 102 and 103 of the outer framework, respectively.

Figure 4A:
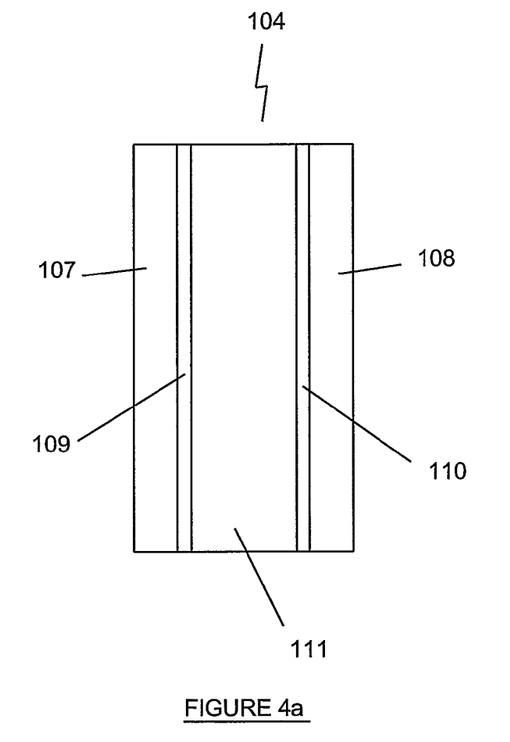
FIG. 4a is a plan view of a peel board carrier frame cross-member.
Figure 4B:
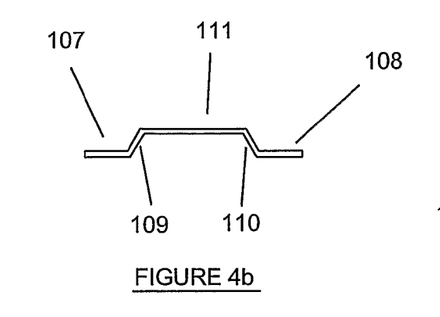
FIG. 4b is an end view of the peel board carrier frame cross-member.
Figure 4C:
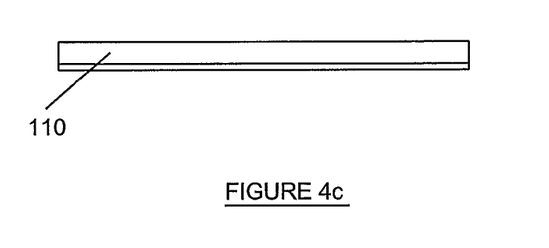
FIG. 4c is a side elevation of the peel board carrier frame cross-member.

Referring to FIGS. 4a and 4b, the reinforcing members 104, 105 and 106 are each formed from initially flat stainless steel sheet that is shaped to create a channel cross-section. The shape of the channel cross-section, which is common to transverse cross-member 104 and the longitudinal bracing members 105 and 106, is substantially trapezoidal and is shown schematically in FIGS. 4a, 4b and 4c. For clarity and simplicity the member shown is labelled 104 only. The cross-member 104 comprises a flat top portion 111 and two side portions 109, 110 which converge towards the top portion 111. Horizontal lip portions 107 and 108 are provided at the free edges of the side portions 109, 110, respectively. It will be appreciated that the reinforcing members 104, 105 and 106 can have any other suitable configuration which enables the reinforcing function of the members.

Referring to FIG. 3a, the length of the cross-member 104 is such that, when in position within the outer framework, the opposing ends of the cross-member 104 extend between the inner faces of the vertical legs of the side members 101 and 102. The respective ends of the cross-member 104 overlap the horizontal legs of side members 101, 102. At the overlapping regions 113, 114 (FIG. 3a), the undersides of the lips 107, 108 of the cross-member 104 rest upon the upper surface of the horizontal legs of the side members 101 and 102, with the ends of the cross-member 104 abutting the inner surfaces of the respective vertical legs. Permanent fastening of the cross-member 104 ends to the side members 101, 102 is effected by seam welding the lips 107, 108 of the cross-member 104 to the upper surfaces of the horizontal legs at the overlapping regions 113, 114. Other suitable ways are possible for securing the cross-member 104 in position.

The longitudinal bracing members 105, 106 each extend from the lips 107, 108 respectively of the cross-member 104 to the inner faces of the vertical legs of the end members 102 and 103 of the outer framework, respectively. In this arrangement, as shown in FIG. 3a, the ends of the brace members 105, 106 overlap the lips 107, 108 of the cross-member 104 and the upper surfaces of the horizontal legs of end members 102, 103, respectively. Permanent fastening of the bracing members 105, 106 to the cross member 104 and the respective outer frame end members 102, 103 is effected by seam welding the overlapping portions. Other ways are possible for securing the bracing members 105, 106 in position.

Figure 5A:
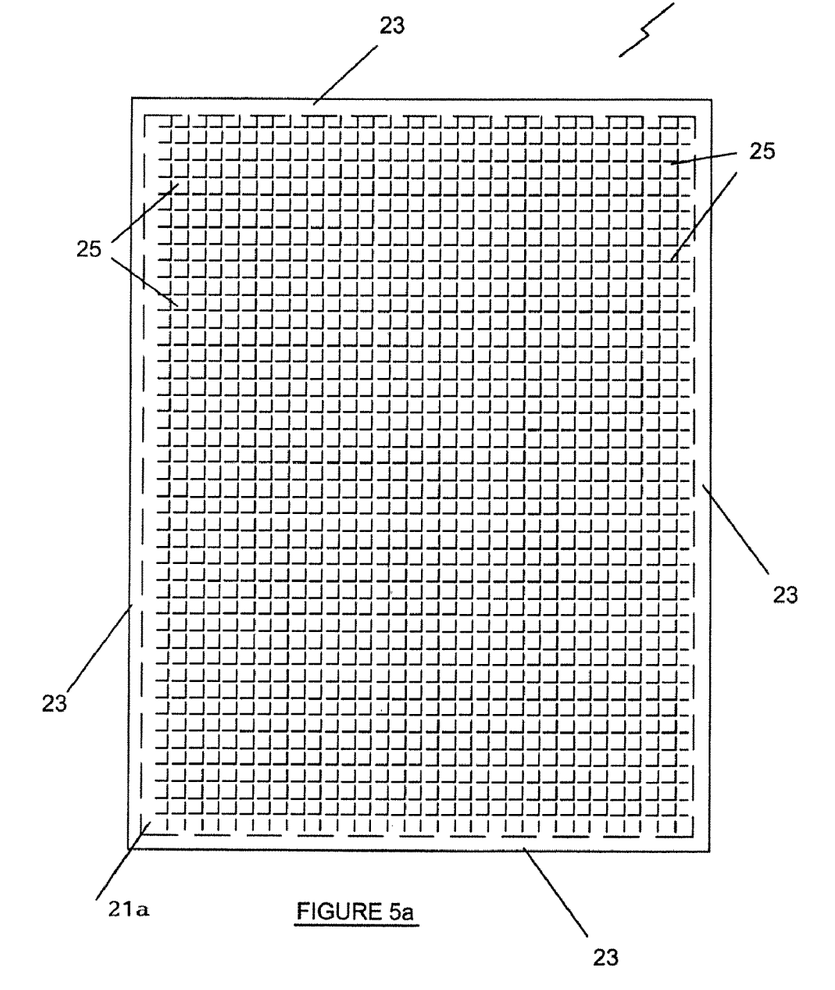
FIG. 5a is a plan view of a peel board.
Figure 5B:
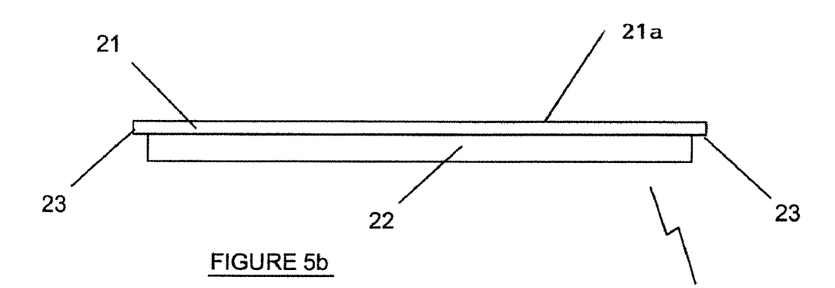
FIG. 5b is a side elevation of the peel board.
Figure 5C:
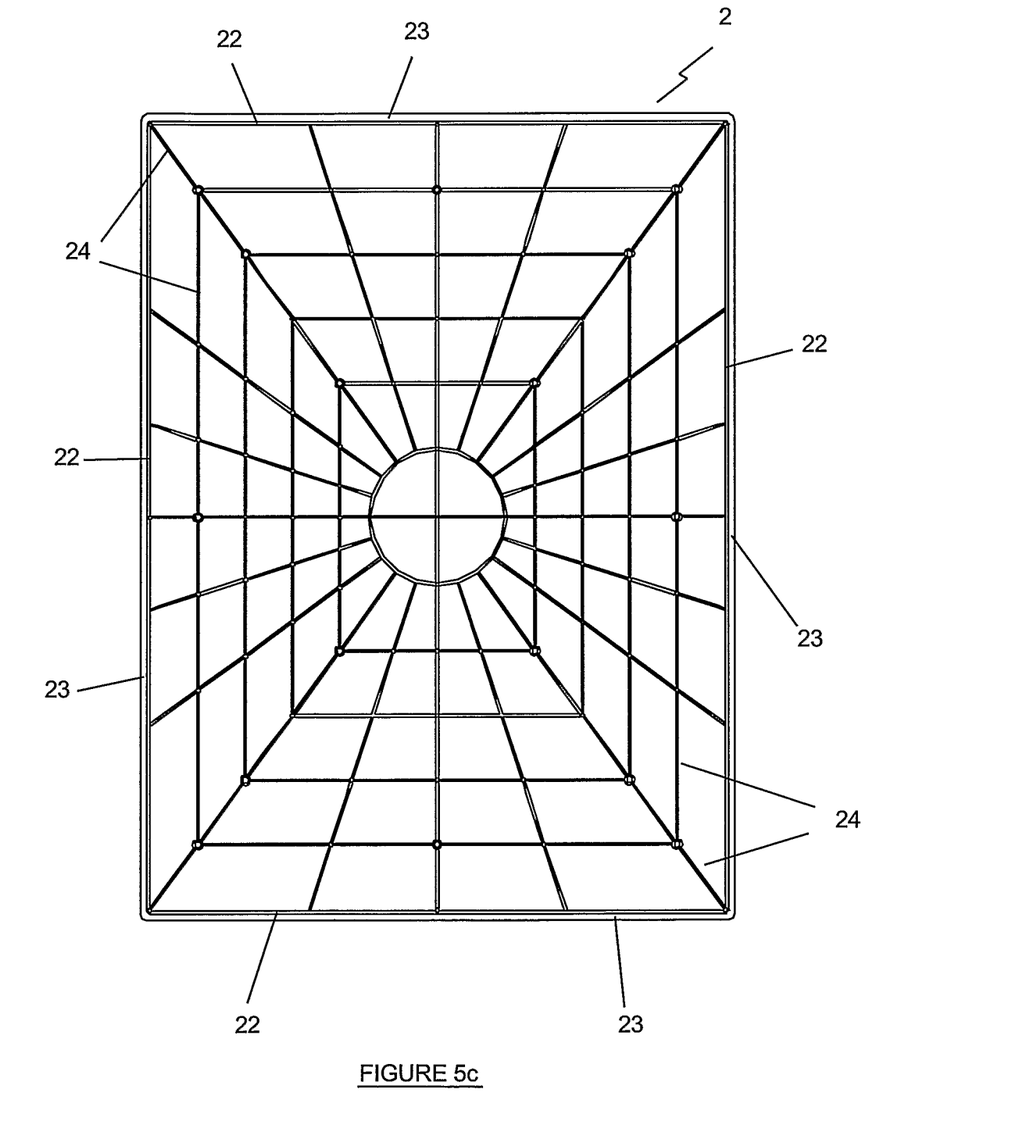
FIG. 5c is a plan view of the peel board underside.

FIGS. 5a and 5b show a peel board 2. The peel board is a one-piece injection moulded plastics construction that is manufactured having an upper section 21 that provides a substantially rectangular shaped upper surface 21a which is suitable for receiving dough in the manufacture of baked products, and a substantially rectangular and hollow lower section that is defined by a wall 22 extending along the periphery of the underside of the board. The wall 22 in use resides within the rectangular opening defined by the outer framework members 100, 101, 102 and 103 of the frame 1 when the board 2 is in place. Within the confines of the wall 22, the interior of the lower section contains a plurality of reinforcing webs 24 integrally moulded with the underside surface of the board 2. The reinforcing webs 24 project from the underside of the board 2 to a position level with the lower edge of the wall 22. An exemplary arrangement of webs 24 is shown in FIG. 5c. They provide reinforcement to the board structure in all its axes. A load-bearing lip 23 extends around the entire perimeter of the board 2 and projects outwardly and laterally from the upper section 21 beyond the boundaries of the wall 22. The overall dimensions of the wall 22 are such that when it is placed into position within the frame 1, a close clearance fit between the wall 22 and the outer members 100, 101, 102 and 103 is achievable. With the wall 22 of the board 2 placed into the frame 1, the underside of the lip 23 rests on upper edges of the outer framework members 100, 101, 102 and 103. The lip 23 also projects laterally beyond the confines of the outer framework of the frame 2 at a distance that is sufficient to allow easy removal of the board from the frame by gripping the lip 23.

The upper, dough receiving, surface 21a of the peel-board 2 is provided with a plurality of shallow diamond-shaped indents 25. Semolina flour that is typically sprinkled onto peel-boards is retained in the indents and assists the removal of dough from the board 2 after proving of the dough.

The inner faces of the vertical legs of the outer members 100 to 103 of the frame 1 may be provided with a plurality of inwardly projecting protuberances 115 defined by hollow impressions made in their outer surfaces. The protuberances 115 abut the wall 22 of the board 2 when it is placed into position within the frame 1. By occupying the clearance gap between the outer members 100 to 103 and the wall 22, the protuberances 115 hold the board 2 more firmly in position in the frame 2 so as to restrict lateral fluctuations of the board 2 within the frame 1 thus reducing wear of the board 2 during use.

The frame according to the invention affords a strong and robust protection to a peel-board carried by it when the frame and board are passing through various stages of an automated process. Inevitably, the frame will experience some jarring, collisions and other rough treatment as it passes through the factory, but since it is constructed robustly from a strong material, it will not readily be damaged by such exposure, whereas the more fragile peel board retained within the confines of the frame will be protected by the frame elements. This elongates the useful working life of the peel boards. For maintenance and cleaning purposes, the peel board and frame can readily be disassembled.

It will of course be understood that the invention is not limited to the specific details described herein, which are given by way of example only and that various modifications and alterations are possible within the scope of the invention as defined in the appended claims.

The invention claimed is:

1. A dough piece carrier assembly comprising a frame for releasably receiving and holding a dough carrier board for receiving dough portions thereon and comprises a lip extending along the perimeter of the board and a structural reinforcing means having a plurality of reinforcing web members located on the underside of the board, the frame having a plurality of side walls defining an inner space for releasably receiving the board, wherein the side walls encompass peripheral regions of the board so as to protect said regions from wear during use of the board, and in which each side wall comprises an inwardly facing ledge and the board is supported in the frame on at least one cross member which is connected to and extends between ledges of opposing side walls, and in which each cross member is recessed relative to a distal edge of the side walls such that the board has a wall that resides within the inner space defined by the frame and the lip rests on upper edges of the side walls.

2. The assembly as claimed in claim 1, wherein the frame is quadrilateral shaped.

3. The assembly as claimed in claim 1, wherein the at least one cross-member protects the underside of the board in use.

4. The assembly as claimed in claim 1, wherein the frame is sized to restrict lateral movements of the board within the frame.

5. The assembly as claimed in claim 1, in which the side walls include a plurality of protuberances on inner surfaces of the side walls for engaging the board to further restrict movement of the board within the frame.

6. A dough piece carrier assembly, comprising:
a frame for releasably receiving and holding a dough carrier board, the frame having a plurality of side walls defining an inner space for releasably receiving the board, and each side wall comprising an inwardly facing ledge;
at least one cross-member extending between and connected to ledges of opposing sides of the frame and supporting an underside surface of the board in use;
a plurality of reinforcing web members located on the underside of the board; and
the board comprises a textured upper surface for receiving dough portions, the textured upper surface comprising a series of indents serving as air-pockets for preventing the dough from sticking to the upper surface of the board.

7. The assembly as recited in claim 6, wherein the frame is quadrilateral shaped.

8. The assembly as recited in claim 6, wherein the frame is sized to restrict lateral movements of the board within the frame.

9. The assembly as recited in claim 6, wherein the side walls include a plurality of protuberances on inner surfaces of the side walls for engaging the board to restrict movement of the board within the frame.

10. The assembly as recited in claim 6, wherein the board comprises a peel-board surface for receiving dough portions thereon and the board includes a lip extending along the perimeter of the board for engaging the side walls of the frame upon placement of the board within the frame.

11. The assembly as recited in claim 10, wherein the board lip projects laterally beyond the side walls of the frame so as to facilitate removal of the board from the frame by gripping the projecting portions of the lip.

12. A dough piece carrier assembly comprising a frame for releasably receiving and holding a dough carrier board comprising a lip extending along the perimeter of the board and a textured upper surface for receiving dough portions, the textured upper surface comprising a series of indents serving as air-pockets for preventing the dough from sticking to the upper surface of the board, the indents further serving to receive particles of loose material which fall from the dough, the frame having a plurality of side walls defining an inner space for releasably receiving the board, wherein the side walls encompass peripheral regions of the board so as to protect said regions from wear during use of the board, and in which each side wall comprises an inwardly facing ledge and the carrier board is supported in the frame on at least one cross member which is connected to and extends between ledges of opposing side walls, and in which each cross member is recessed relative to a distal edge of the side walls such that the dough carrier board has a wall that resides within the inner space defined by the frame and the lip rests on upper edges of the side walls.

13. The assembly as claimed in claim 12, wherein the frame is quadrilateral shaped.

14. The assembly as claimed in claim 12, wherein the at least one cross-member protects the underside of the board in use.

15. The assembly as claimed in claim 12, wherein the frame is sized to restrict lateral movements of the board within the frame.

16. The assembly as claimed in claim 12, in which the side walls include a plurality of protuberances on inner surfaces of the side walls for engaging the board to further restrict movement of the board within the frame.

17. A dough piece carrier assembly comprising a frame for releasably receiving and holding a dough carrier board for receiving dough portions thereon and comprises a lip extending along the perimeter of the board, the frame having a plurality of side walls defining an inner space for releasably receiving the board, wherein the side walls encompass peripheral regions of the board so as to protect said regions from wear during use of the board, and in which each side wall comprises an inwardly facing ledge and the carrier board is supported in the frame on at least one cross member which is connected to and extends between ledges of opposing side walls, and in which each cross member is recessed relative to a distal edge of the side walls such that the dough carrier board has a wall that resides within the inner space defined by the frame and the lip rests on upper edges of the side walls, wherein the lip has a portion that projects laterally beyond the side walls of the frame so as to facilitate removal of the board from the frame by gripping the projecting portion of the lip.

18. The assembly as claimed in claim 17, wherein the frame is quadrilateral shaped.

19. The assembly as claimed in claim 17, wherein the at least one cross-member protects the underside of the board in use.

20. The assembly as claimed in claim 17, wherein the frame is sized to restrict lateral movements of the board within the frame.

21. The assembly as claimed in claim 17, in which the side walls include a plurality of protuberances on inner surfaces of the side walls for engaging the board to further restrict movement of the board within the frame.

\* \* \* \* \*